March 11, 1930.                    J. R. PEIRCE                    1,750,191
                       PERFORATED CARD CONTROLLED MACHINE
                         Filed July 7, 1927        11 Sheets-Sheet 1

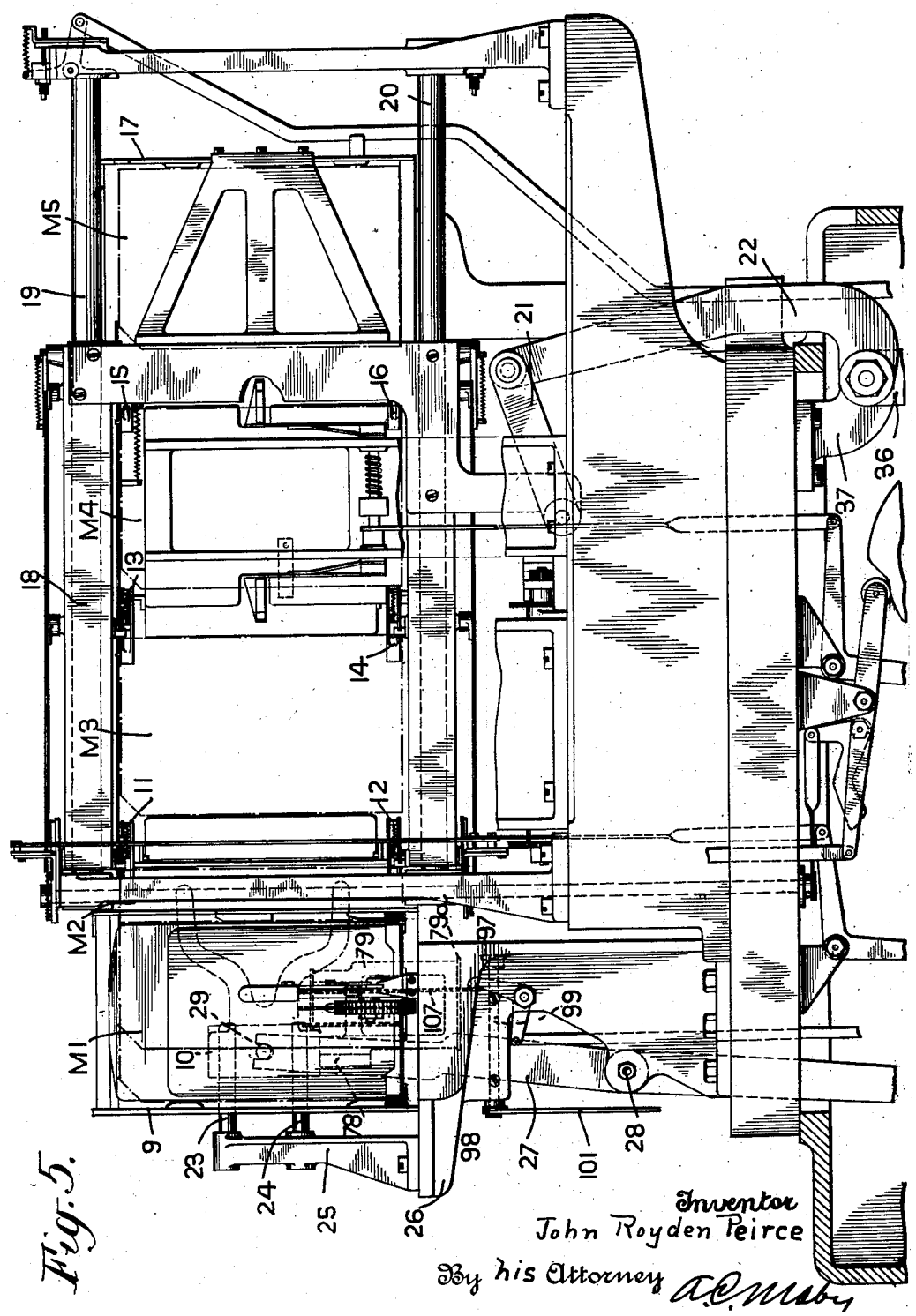

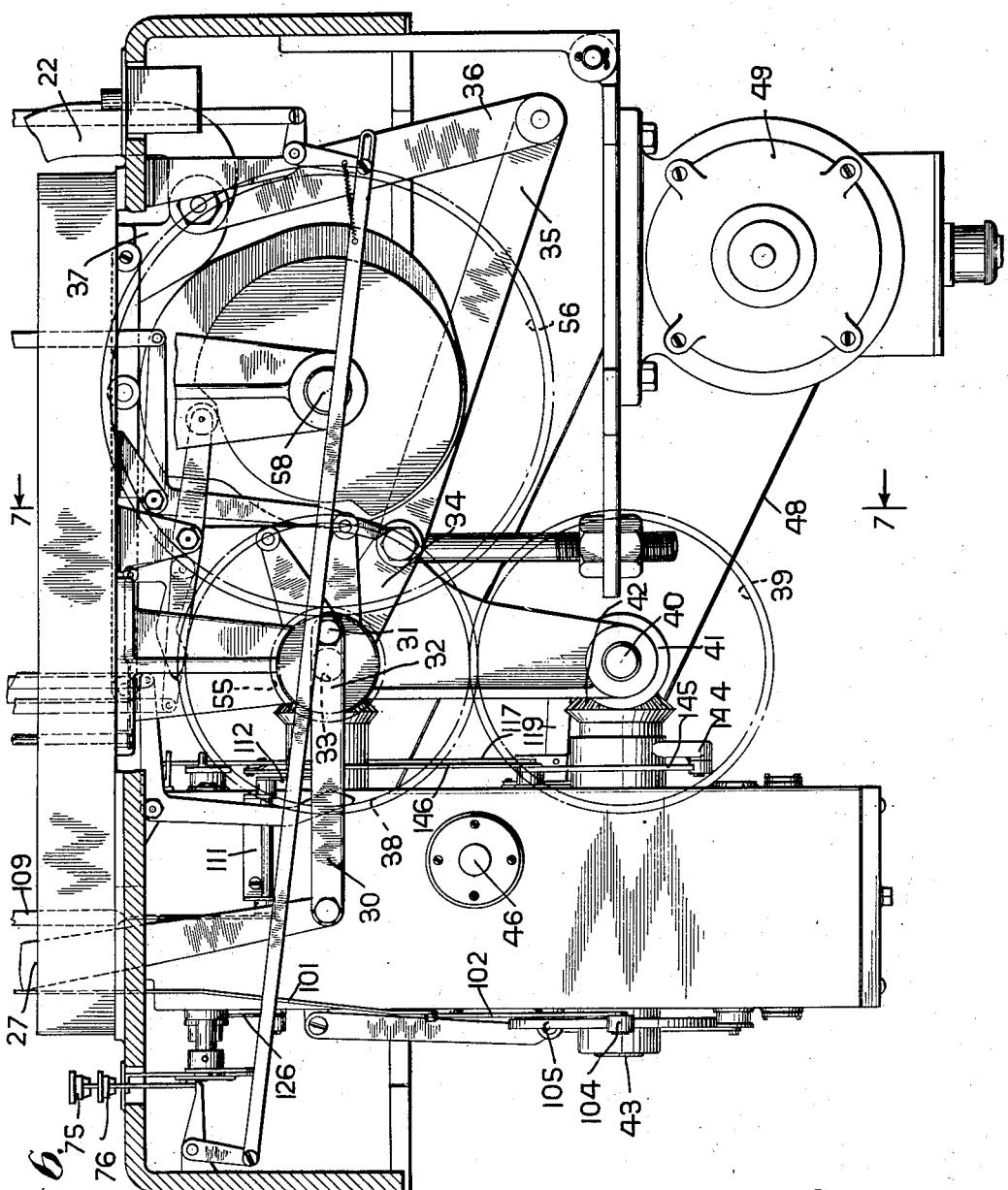

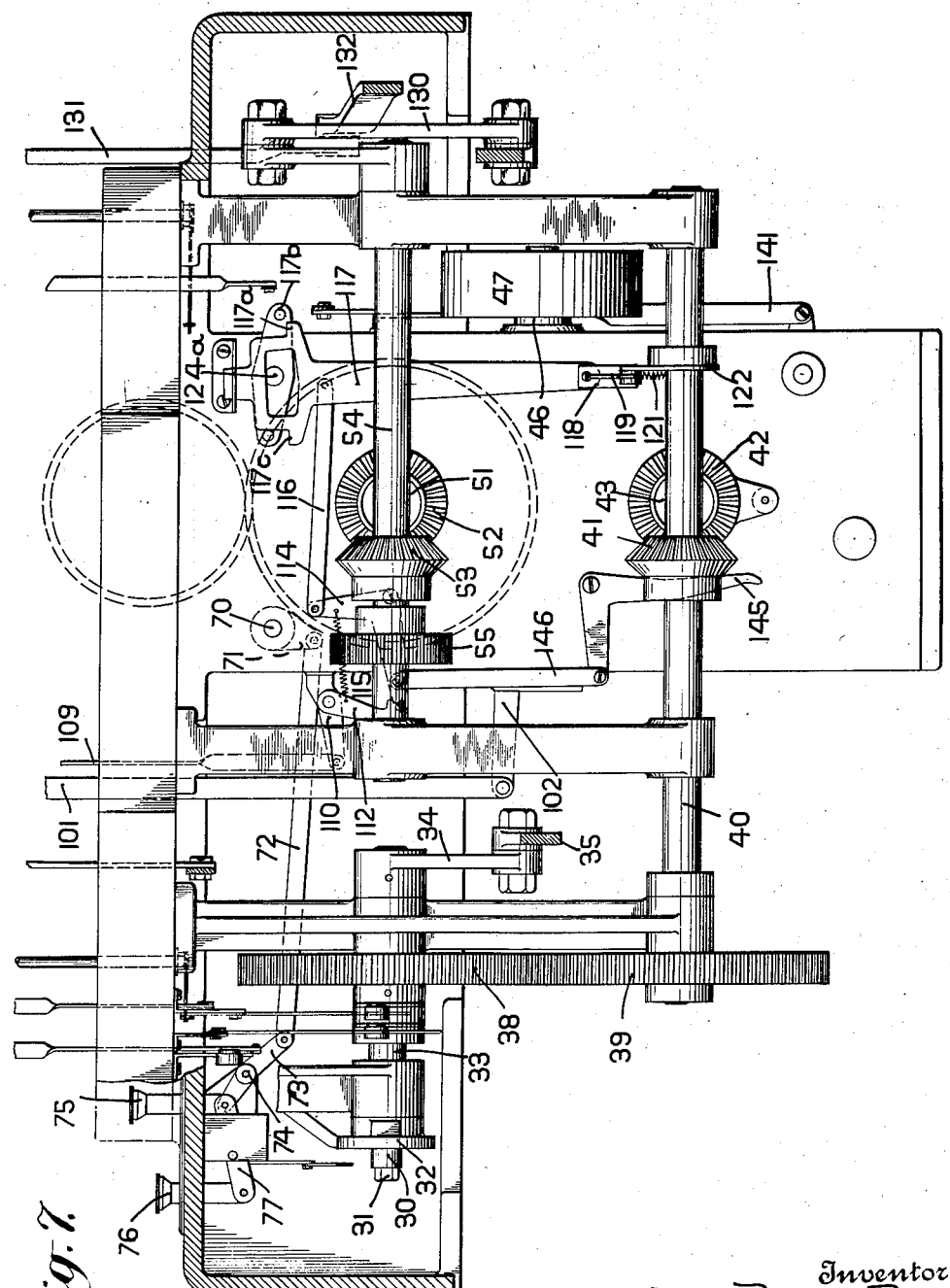

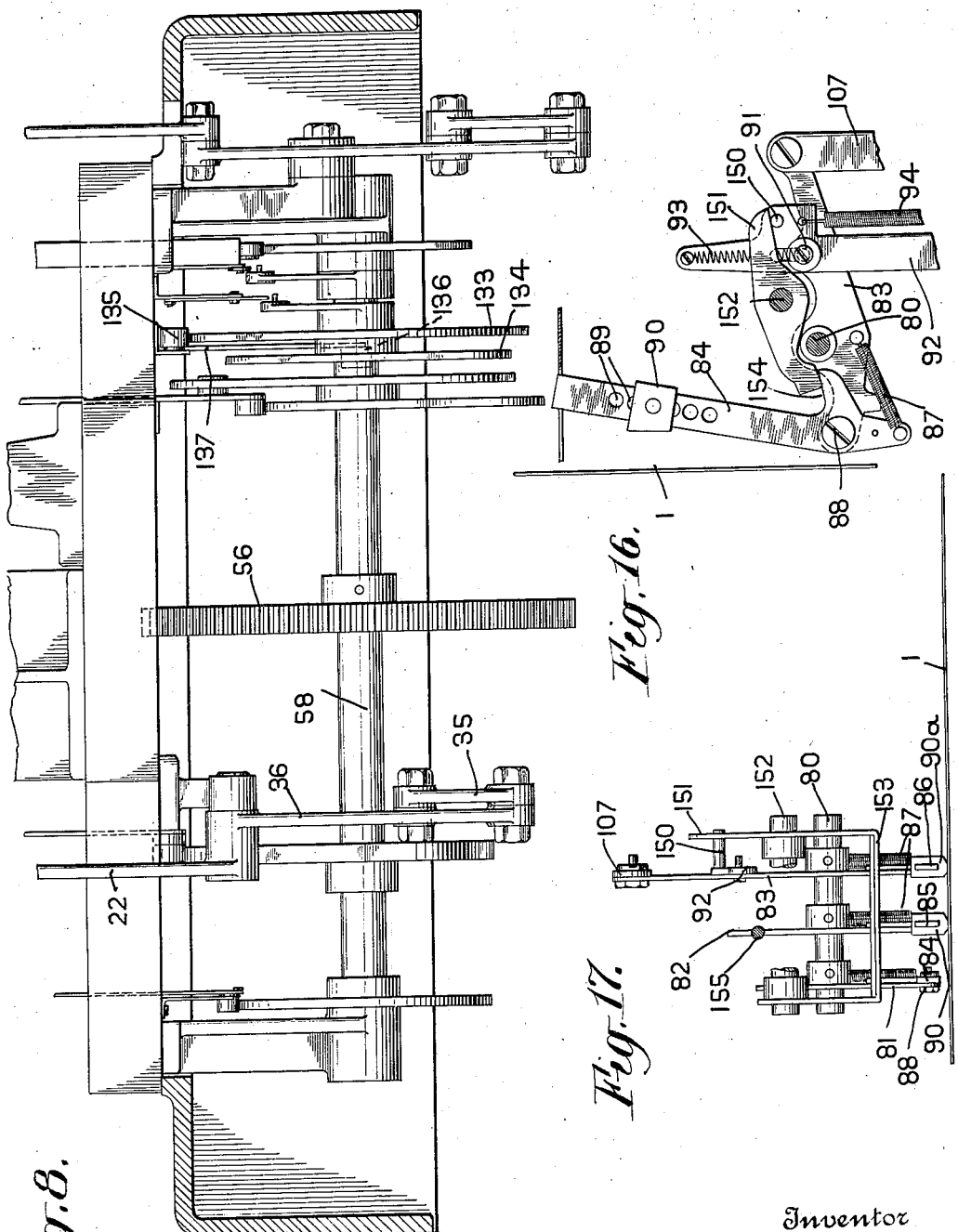

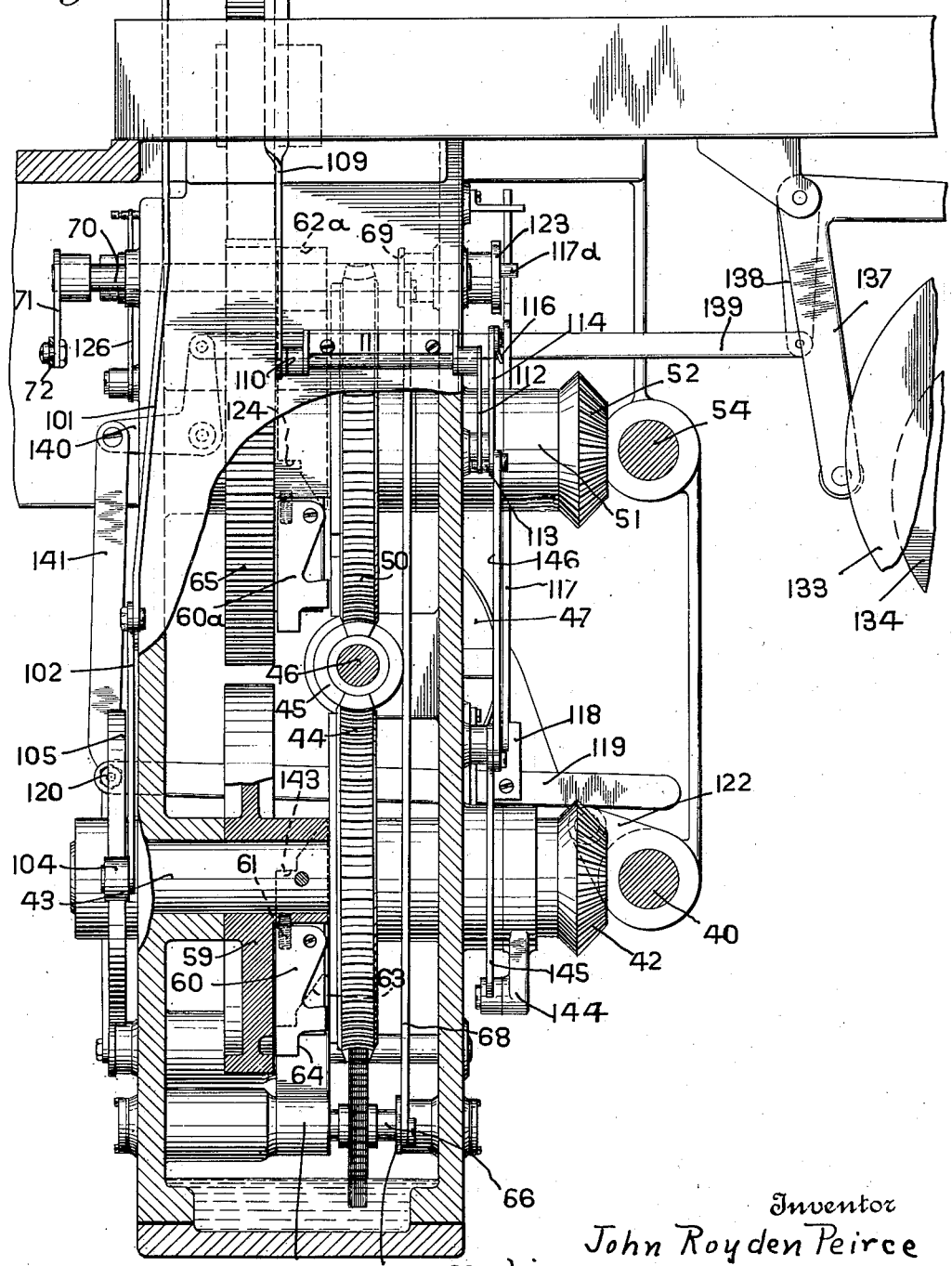

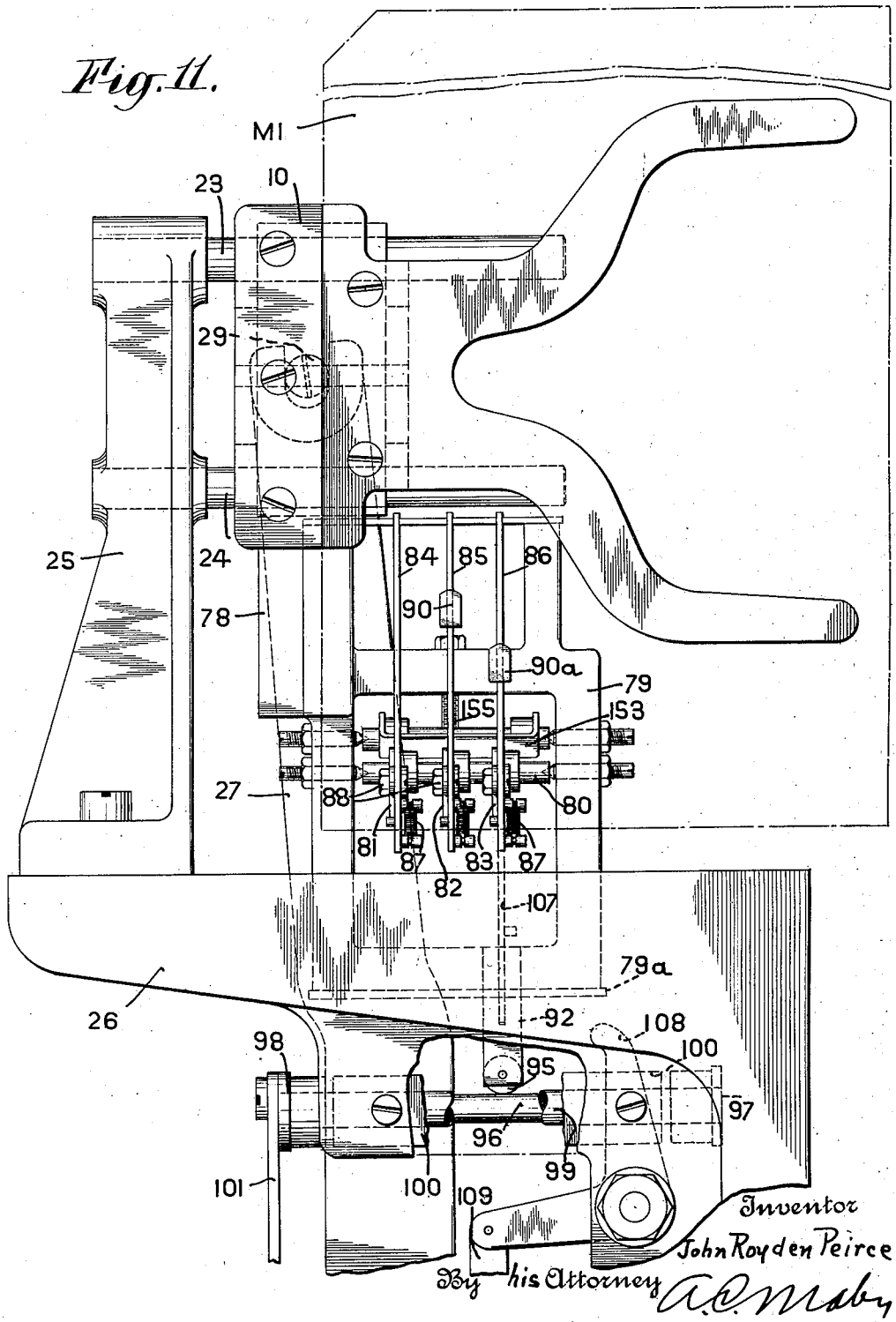

March 11, 1930.  J. R. PEIRCE  1,750,191
PERFORATED CARD CONTROLLED MACHINE
Filed July 7, 1927  11 Sheets-Sheet 9
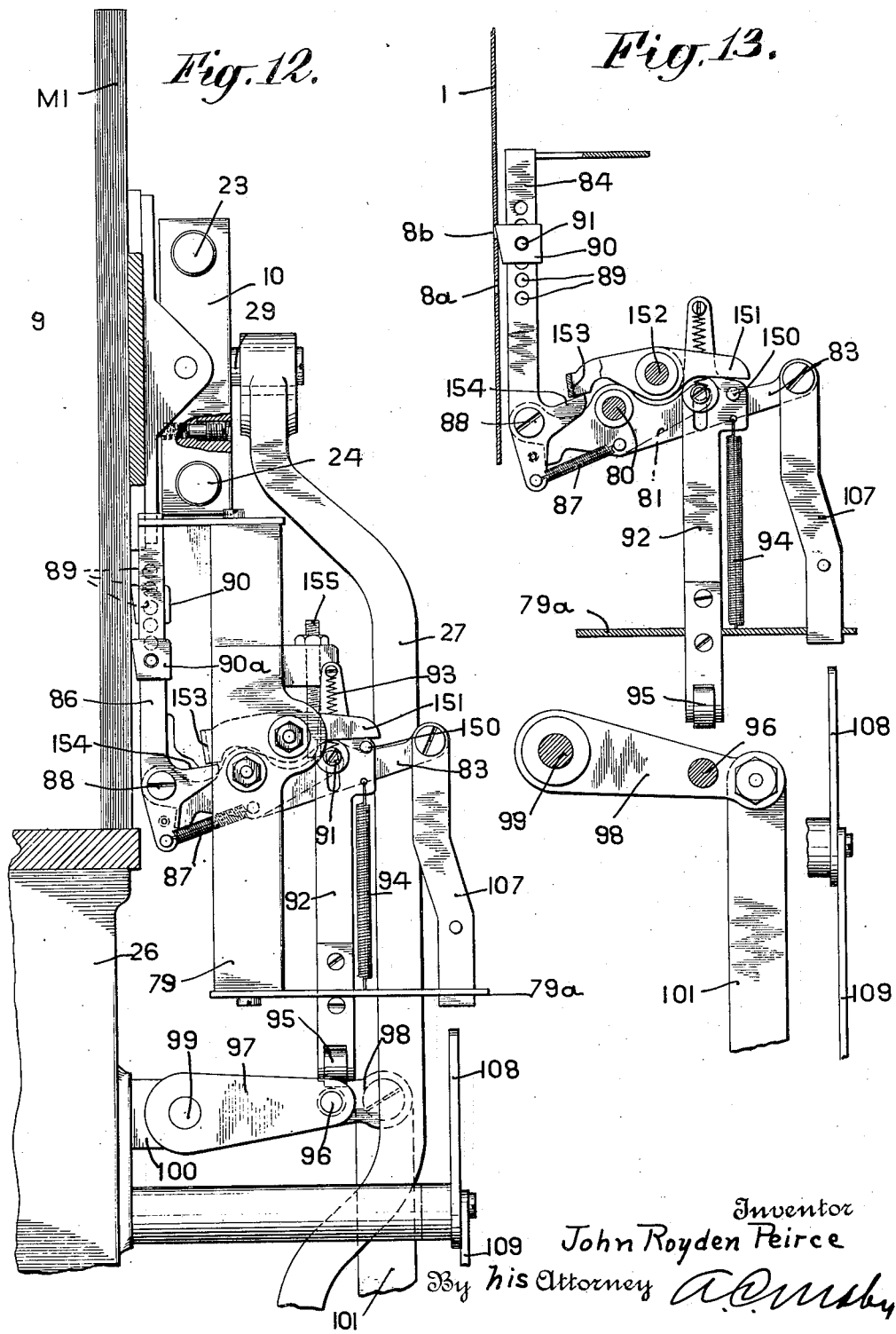
Inventor
John Royden Peirce
By his Attorney

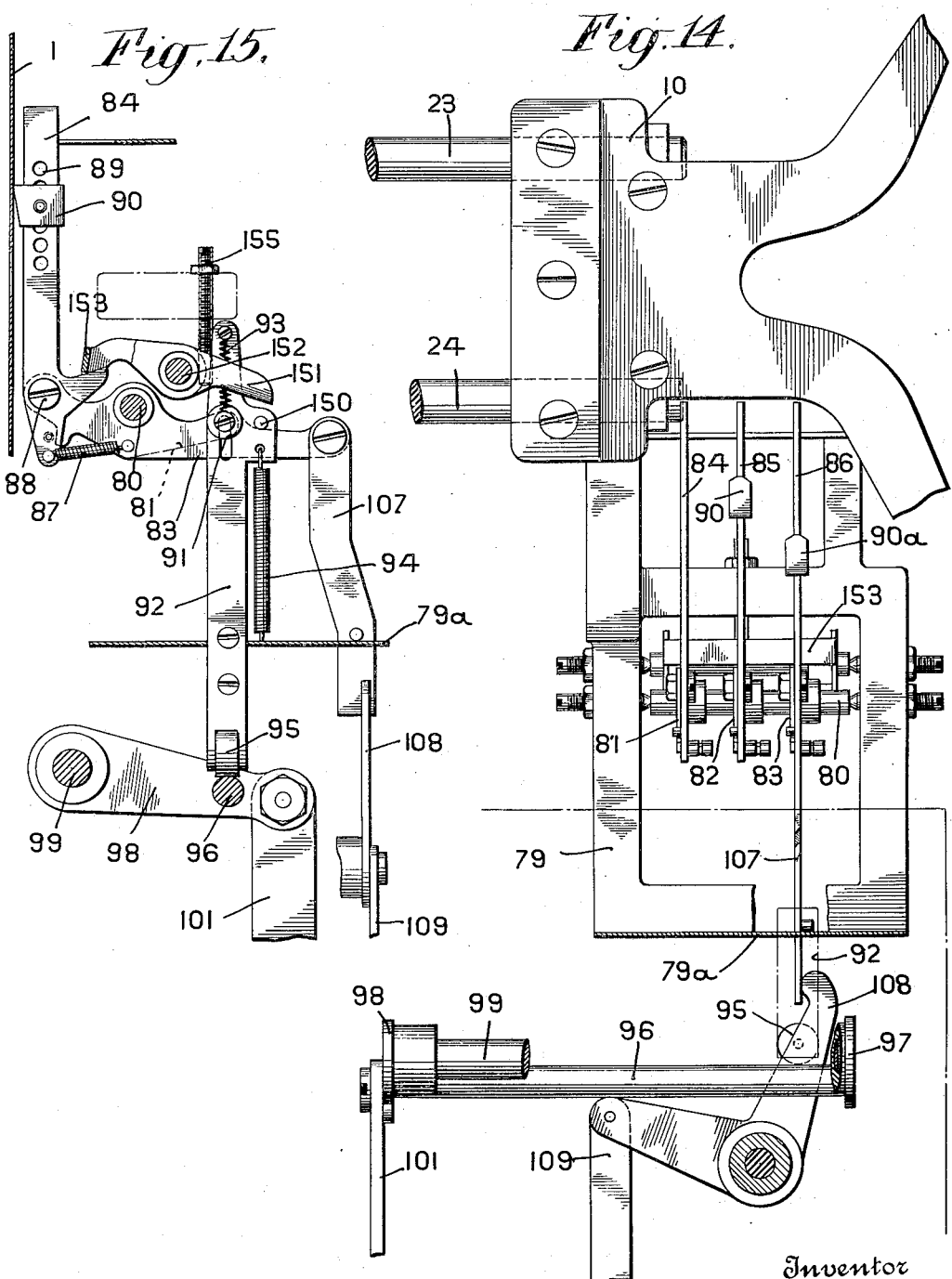

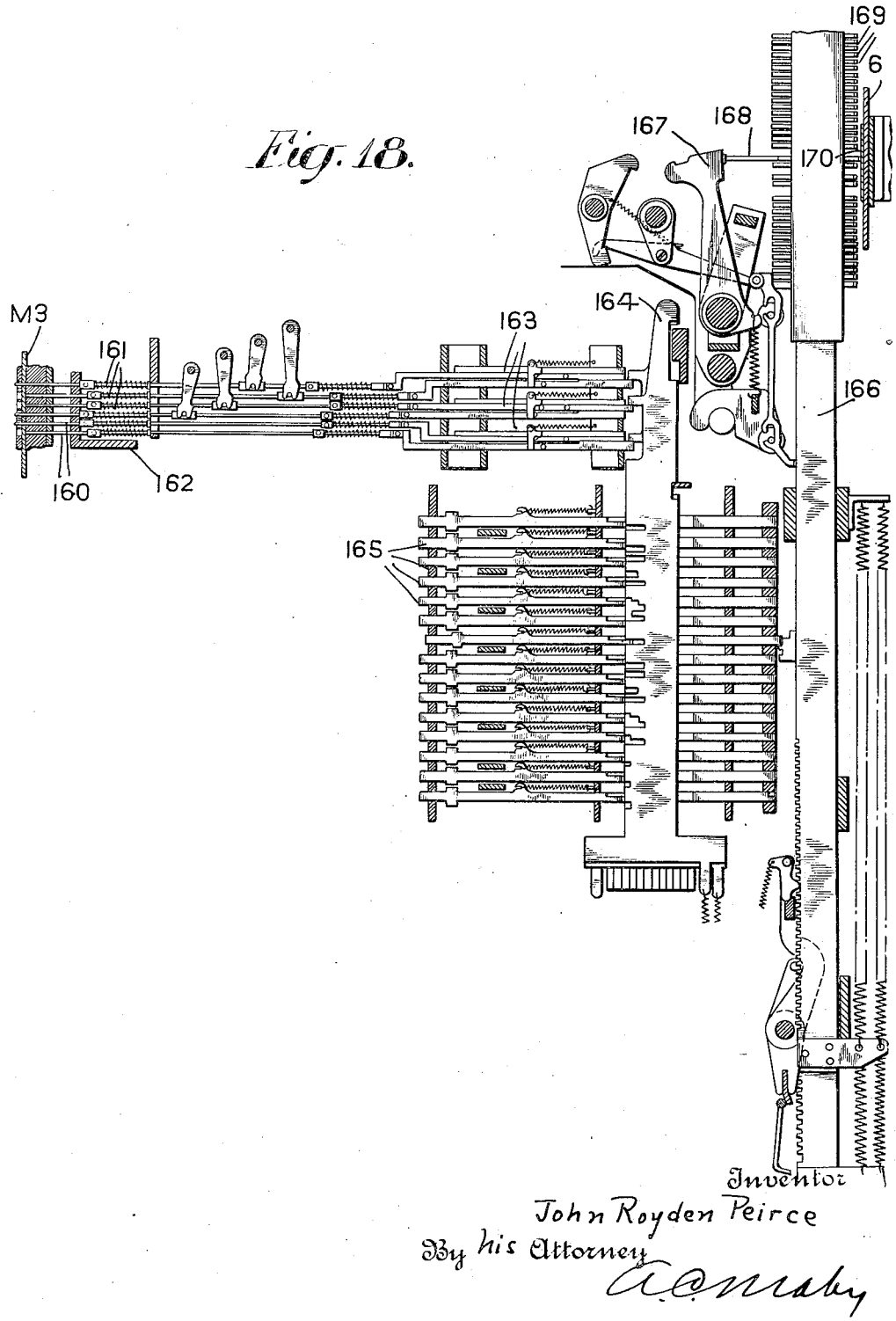

Patented Mar. 11, 1930

1,750,191

UNITED STATES PATENT OFFICE

JOHN ROYDEN PEIRCE, OF NEW YORK, N. Y., ASSIGNOR TO INTERNATIONAL BUSINESS MACHINES CORPORATION, OF NEW YORK, N. Y., A CORPORATION OF NEW YORK

PERFORATED-CARD-CONTROLLED MACHINE

Application filed July 7, 1927. Serial No. 203,890.

This invention relates to perforated card controlled machines and more particularly to means for pre-reading a record card, that is, analyzing the record prior to the regular analysis thereof and differentially controlling the machine in accordance with this pre-reading.

In my Patent No. 1,506,382, dated August 26, 1924, I disclose a machine adapted for use in connection with insurance or other business. In that machine mechanisms are shown for analyzing a master record card and for printing and perforating additional record cards under control of such master cards. The machine in analyzing a master card ascertains whether or not a card is to be printed and perforated under control of the master card. If such a card is to be printed and perforated the machine proceeds to perform such operations which require several cycles of operation of the machine. If no such card is to be printed and perforated under control of the master card, the machine performs several idle cycles of operation before the next master record card is analyzed. These idle operations of the machine when no card is to be printed and perforated under control of a master card represent time lost by the machine.

In illustrating the application of the present invention, I have shown it in connection with such a machine as is disclosed in my aforesaid patent and in connection with such a machine the device of the present invention is capable of analyzing the master record cards before they reach the normal analyzing position and if a card is found to be active, that is, if a second card is to be printed and perforated under control of the master card, the machine is set to perform such operations, the master card being fed in the usual manner to the regular analyzing station and the machine operated through its several normal cycles to perform the printing and perforating in connection with the second card. If the master card is found to be inactive, that is, if no second card is to be printed and perforated under control thereof, the machine is set to feed such master card into the discharge station and to immediately feed a new master card for analysis, thus avoiding the idle cycles of operation.

Referring to the drawings wherein I have shown one form of my invention:

Fig. 1 is an illustration of a master card adapted to control the operations of the machine;

Fig. 2 is a notice and audit card adapted to be produced under control of the master card;

Figs. 3 and 4 are fragmentary portions of the master card showing different control perforations for controlling the operation of the machine;

Fig. 5 is a front elevation of a portion of the machine above the base showing the master card feeding mechanisms;

Fig. 6 is a portion of the machine below the base directly below the mechanisms shown in Fig. 5;

Fig. 7 is a section taken substantially on line 7—7 of Fig. 6;

Fig. 8 is a view of some of the mechanisms shown in Fig. 6 as seen when looking at the machine from the right as disclosed in Fig. 6;

Fig. 10 is a sectional view of the gear and clutch box as seen when viewing Fig. 9 from the left;

Fig. 11 is an enlarged view of the card picker mechanism disclosed in Fig. 5;

Fig. 12 is a view looking at Fig. 11 from the left, parts being shown in section;

Fig. 13 is a detail of mechanism shown in Fig. 12 for pre-reading the card;

Fig. 14 is a fragmentary view showing parts disclosed in Fig. 11 in different positions;

Fig. 15 is a view similar to Fig. 13 with the parts in different positions;

Fig. 16 is a further view of the mechanism shown in Fig. 13 with the parts in still another position;

Fig. 17 is a plan view of the mechanism shown in Fig. 15.

Fig. 18 is a sectional elevation of means for sensing a record card and of mechanisms controlled by said means.

Figure 9:
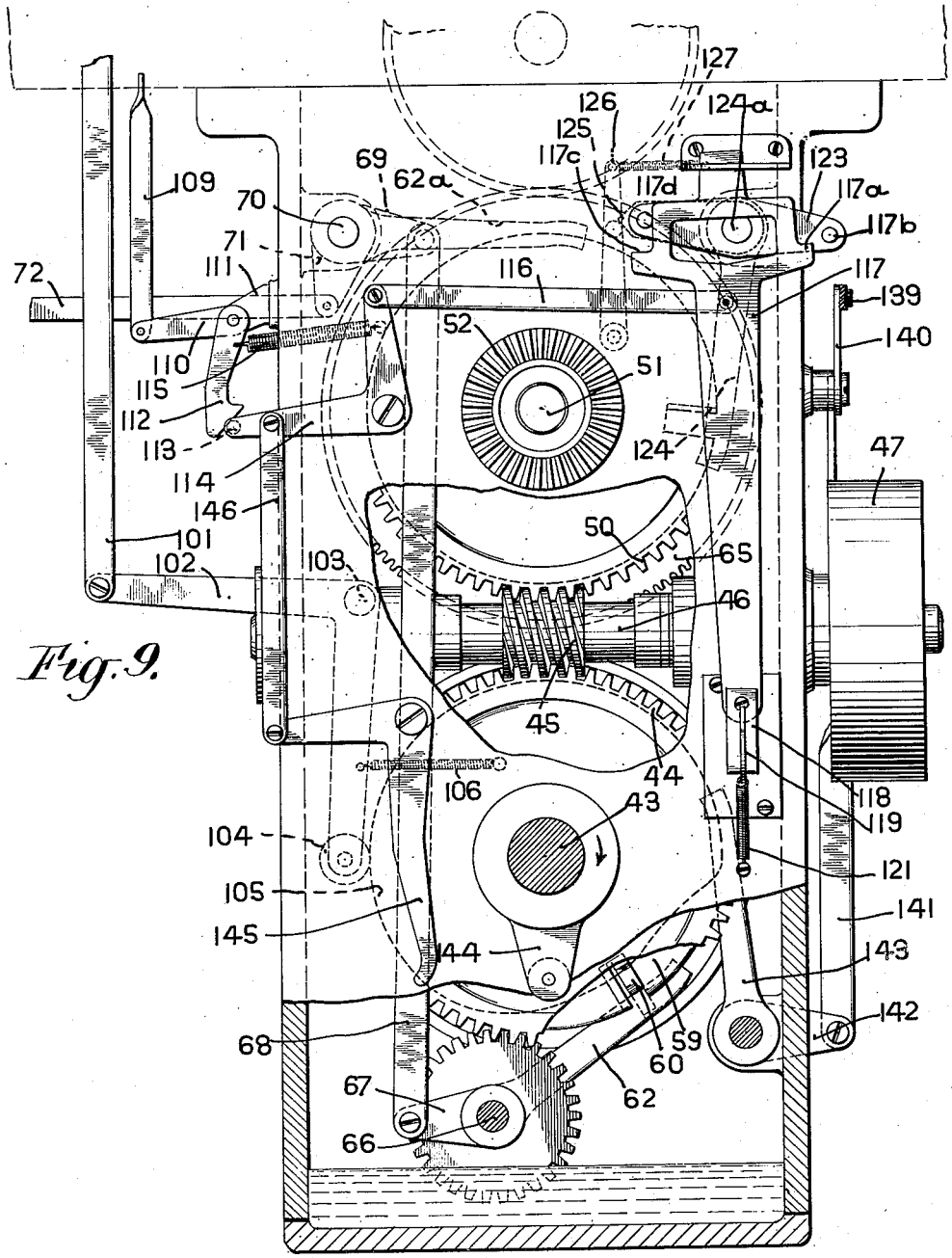
Fig. 9 is an enlarged view of the gear and clutch box shown in Fig. 7 and connections thereto.

Referring to Fig. 1 the master card 1 is shown as having horizontal fields 2, 3, 4 and 5 containing printed information and horizontal fields 2ᵃ, 3ᵃ, 4ᵃ and 5ᵃ containing perforated data representing the printed data in the fields directly thereabove. In the operation of the machine disclosed in my aforesaid patent if a premium is falling due in connection with an insurance policy represented by the master card 1, the master card controls the making of a notice as disclosed upon the notice card 6 (Fig. 2). The machine is adapted to read the data contained in the perforated field 2ᵃ of the master card and under control of such perforations print data contained in the upper field 2ᵇ on the notice card. After this has been done the machine then analyzes the perforations in the field 3ᵃ of the master card and prints the information represented thereby in the horizontal line 3ᵇ on the notice card. Similarly the machine then analyzes field 4ᵃ on the master card and prints the line 4ᵇ on the notice card and then analyzes the field 5ᵃ on the master card and prints the line 5ᵇ on the notice card. In connection with the printing of the data contained on the notice card 6 the machine also prints in the fields 2ᶜ and 2ᵈ on the audit portion 6ᵃ of the notice card and perforates data in the fields 2ᵉ and 2ᶠ, this perforated data representing the printed data in the upper fields 2ᶜ and 2ᵈ. In the course of business the audit card 6ᵃ will be detached from the notice portion 6 and will be used in a subsequent machine to effect posting upon the master card indicating that a due premium has been paid. In ascertaining whether a notice card is to be made out the machine analyzes fields 7, 7ᵃ, 7ᵇ and 7ᶜ, each of these fields representing one of four years constituting the life of the master card. Each of the year fields 7 to 7ᶜ, inclusive, are divided into 12 divisions representing the 12 months as indicated. If a premium is due once a year in connection with the policy a perforation in the month in which the premium is payable indicates this fact as shown at 8 in Fig. 3 where a perforation indicates that premiums are payable annually in the month of January. If premiums are payable quarterly, perforations appear in the four months of field 7 in which the premiums are payable as shown at 8ᵃ, 8ᵇ, 8ᶜ and 8ᵈ in Fig. 1. If premiums are payable semi-annually, perforations will appear in the months of field 7 in which the premiums are payable. In analyzing a master card to ascertain when premiums are payable the machine always analyzes in the first of the four year fields, that is in the year field 7, whether the card year is represented in that field or in one of the other three fields 7ᵃ, 7ᵇ or 7ᶜ. In other words, if the machine is operating for the year 1921, the perforations in the month positions of the year field 7 will indicate the times in which payments are due. If on the other hand the machine is operating for the year 1922 which is represented by the field 7ᵃ the machine will still ascertain the times at which payments are due by analyzing in the month positions of the year field 7, etc. Normally, if premiums are payable monthly this would be indicated by a perforation at each of the twelve month positions in the year field 7 but in order to avoid perforating so many holes in this field, I prefer to use but one hole which may be arbitrarily punched in the January position of field 7ᵃ as indicated in Fig. 4. The machine thus besides analyzing the months in the year field 7 to ascertain the times of payments of premiums, will also analyze the January position in field 7ᵃ and if no perforations appear in any of the month positions of the year field 7 but a perforation appears in the January position in the field 7ᵃ, the machine will produce a notice once a month, or in other words, each time a card is run through the machine.

In the normal operation of the machine the master cards are passed through the notice writing machine once each month and the machine is set to analyze the month position in field 7 for which notices are being written. If no perforation appears at such position, no notice is written but if a perforation does appear then the notice is produced. A perforation in the January position of field 7ᵃ will, of course, as stated, cause a notice to be written whenever the card is run through the machine.

Referring to Fig. 5 the master cards M¹ are stacked in the supply magazine 9 and are advanced therefrom one by one by a card picker 10 to the position referred by dotted lines M². From here the cards are taken by clips 11, 12 and advanced to the position M³. From this position they are advanced by clips 13, 14 to position M⁴ and from the latter position they are advanced by clips 15, 16 to the position M⁵ in the discharge pocket 17. The card clips 11 to 16, inclusive are carried by a clip carriage 18 slidably mounted on rods 19, 20, the carriage being connected by a link 21 to an arm 22 for reciprocation. The card picker 10 is slidably mounted on rods 23, 24, fixed in a standard 25 attached to the frame 26 of the machine. A lever 27 pivoted at 28 is bifurcated at its upper end and cooperates with a pin 29 fixed to the card picker so that oscillation of the lever 27 will reciprocate the picker. The lower end of the lever 27 is attached to a link 30 connected at its opposite end to a stud 31 fixed to a wheel 32 mounted on shaft 33 (see Figs. 6 and 7).

Shaft 33 also has fixed thereon an arm 34 (Figs. 6 and 7) connected by a link 35 to an arm 36 pivotally connected to the bracket 37 and fixedly connected to arm 22 (Figs. 5 and 6) for reciprocating the clip carriage 18. Shaft 33 is driven by means of a gear 38 fixed thereon meshing with a gear 39 fixed on shaft 40 and provided with a bevel gear 41 meshing with bevel gear 42 fixed on shaft 43. Loosely mounted on shaft 43 is a worm wheel 44 (Figs. 9 and 10) meshing with a worm 45 fixed on shaft 46 to which is also fixed a pulley 47 connected by a belt 48 (Fig. 6) to the drive motor 49. Also meshing with the worm 45 is a worm wheel 50 loose on shaft 51. Shaft 51 has fixed thereon a bevel gear 52 meshing with bevel gear 53 fixed on shaft 54. Also fixed on shaft 54 is a gear 55 (Figs. 6 and 7) meshing with a gear 56 fixed on shaft 58. In the machine disclosed in my aforesaid patent the shaft 58 controls certain operations and is driven at a lower ratio than the shaft 40 which controls certain other operations. When the motor is running and the shaft 46 is turning worm wheels 44 and 50 will turn freely upon their respective shafts. In order to cause these shafts to rotate, their clutches must be closed. Shaft 43 has fixed thereon a disc or wheel 59 carrying a clutch member 60 actuated by a spring 61 into co-operation with the worm wheel 44. The details of these constructions are well known and need not be fully described here.

To control the clutching and declutching of shaft 43 to worm wheel 44 a clutch cam 62 (Figs. 9 and 10) is provided. If the cam face 63 of the clutch cam is rocked to the position shown in Fig. 9 so as to co-operate with the shoulder 64 of the member 60 as the latter rotates with worm wheel 44 the member 60 will be cammed out of co-operation with the worm wheel and shaft 43 will be stopped. By moving the clutch cam 62 out of co-operation with the clutch member 60 shaft 43 will be brought into operation. A similar clutch member 60ª is carried by a gear 65 fixed on shaft 51 and co-operates with worm wheel 50 for causing this shaft to rotate. The clutch cam 62ª is provided for controlling the clutching of this shaft. Clutch cam 62 is loosely mounted on shaft 66 (Fig. 9) and is connected through its rear arm 67 to a link 68 connected to an arm 69 fixed on shaft 70. The cam 62ª is directly fixed upon shaft 70. Also fixed on shaft 70 is an arm 71 connected by a link 72 to a lever 73 (Fig. 7) pivoted at 74 and connected through pin and slot to the start key 75. Depression of the start key moves link 72 to the right as viewed in Fig. 7 rocking the shaft 70 counterclockwise and this as seen in Fig. 9 will rock clutch cam 62ª counterclockwise out of co-operation with its clutch member 60ª and will through link 68 rock the clutch cam 62 clockwise out of co-operation with its clutch member 60. For stopping the machine a stop key 76 is provided. This key is connected to the start key by a lever 77 and when rocked downwardly to the position shown in Fig. 7 raises the start key 75 to the position shown, moving link 72 to the left rocking shaft 70 clockwise, causing clutch cam 62ª to move to its operative or stopping position as shown in Fig. 9 and causing clutch cam 62 to rock counterclockwise to its stopping position.

*Pre-reading device*

Integral with the card picker 10 is a depending arm 78 (Fig. 11) carrying a frame 79 in which is pivotally mounted a shaft 80. Fixed on this shaft are three arms 81, 82 and 83 (see also Fig. 17). Pivoted to these arms are upright fingers 84, 85 and 86. Springs 87 connected between the fingers and their carrying arms as shown in Fig. 16 tend to rock the fingers counterclockwise about their pivots 88 to move the fingers against the card 1. Fingers 84 and 85 are provided with six holes 89. A feeler member 90 may be mounted on either of these fingers and fixed by means of a set screw or the like reaching into any of the six holes 89. Finger 84 is adapted to co-operate with the month positions January to July respectively in field 7 of the master card 1, the six hole positions 89 corresponding respectively with these month positions. Finger 85 on the other hand corresponds similarly with the month positions designated July to December respectively in this same year field. In operating the machine to ascertain whether notices should be made out, or in other words, whether the master card is active for any one of the twelve months of any year, the feeler 90 will be placed upon the proper one of fingers 84 and 85 and adjusted with respect to the hole 89 in such finger corresponding to the month in question. The finger 86 carries a feeler 90ª fixed in position for co-operating with the month of January in field 7ª of the master card 1. The arm 83 fixed on shaft 80 is longer than arms 81 and 82 and is connected at 91 by pin and slot to a link 92. A spring 93 tends to hold the link 92 in its lower position with respect to arm 83 as in Fig. 12. A spring 94 connected between link 92 and frame 79ª tends to maintain arm 92 in its lowermost position with respect to the frame with roller 95 carried by such link resting upon a rod 96 fixed to arms 97 and 98 which in turn are fixed on a shaft 99 rotatably mounted in brackets 100 (Fig. 12). A link 101 connected to arm 98 reaches downwardly and is connected to a bell crank 102 (Figs. 9 and 10) pivoted at 103 and carrying a cam follower 104 co-operating with a cam 105 fixed on shaft 43. A spring 106 holds the cam follower in co-operation with its cam. Thus as the shaft 43 rotates the rod 96 will be raised and lowered. The timing of this operation is such that the shaft 96 commences to descend at about the time the card picker 10 commences to move to the right to feed a master card from the position M¹ to that of position M². As the rod thus descends link 92 (Figs. 13, 15, 16) will tend to follow under the action of spring 94. This in turn will rock shaft 80 clockwise as viewed in Figs. 13 and 15 causing the several fingers 84, 85 and 86 to ascend with the feelers 90 and 90ᵃ in contact with the master card as in Figs. 12 and 15. Should the feelers 90 and 90ᵃ encounter a perforation in the master card as at 8ᵇ (Fig. 13) the ascent of the fingers will be checked and the shaft 80 will cease to rock clockwise. Should there be no perforation, however, to co-operate with the feelers 90 and 90ᵃ, the fingers will continue to ascend to their uppermost position permitting the roller 95 to follow rod 96 to its lowermost position. Also attached to arm 83 at its outer end is a link 107. Link 107 is guided against lateral movement by the lower portion 79ᵃ of the frame 79 and, of course, moves laterally as viewed in Fig. 11 with the card picker 10 and the frame 79. As the fingers 84, 85 and 86 rise the link 107 descends from the position shown in Figs. 12 and 13 to that shown in Figs. 14 and 15. Thus if the feelers 90 or 90ᵃ encounter a perforation in the master card as in Fig. 13 the link 107 will be prevented from descending and will pass over the top of bell crank 108 as in Figs. 12 and 13 without engaging the bell crank. Should the feelers, however, not encounter a perforation in the card and the fingers rise to their uppermost position causing link 107 to descend, the latter will as it moves toward the right as viewed in Fig. 14 engage and rock bell crank 108 clockwise. This, in turn, will raise link 109 (Fig. 14). This link is connected to arm 110 (Fig. 9) pivoted on bracket 111 and fixed to a latch 112 adapted to co-operate with a stud 113 on a bell crank 114. Normally, while the machine is running, the stud 113 is latched in its upper position by latch 112. A spring 115 holds the latch in position and at the same time tends to rock the bell crank 114 counterclockwise to the position shown in Fig. 9. Also connected to the bell crank is a link 116 connected to an arm 117. Arm 117 is attached at its lower end through an intermediate member 118 (Fig. 9) to a lever 119 (Figs. 10) pivoted at 120. Lever 119 is normally held downwardly by a spring 121 and is adapted to be raised by a cam arm 122 fixed on shaft 40 (Figs. 7 and 10). In the normal operation of the machine, when stud 113 (Fig. 9) is latched in its upper position the shoulder 117ᵃ of member 117 lies under a stud 117ᵃ on a rocker arm 123 and the stud 117ᵇ will be in its upper position with the clutch cam 124 in its inoperative position. Thus as the shaft 40 rotates and the lever 119 is raised once each cycle raising the member 117 no effect is produced upon the operation of the machine. On the other hand when one of the feelers 90 and 90ᵃ fails to cooperate with a perforation in the master card permitting link 107 to descend so that as the latter moves toward the right as viewed in Fig. 14 it will actuate bell crank 108 raising link 109, the bell crank 114 (Fig. 9) will be released and its spring 115 will move the member 117 to the left as seen in Fig. 9 so that on the next upward movement of member 117 shoulder 117ᶜ will engage stud 117ᵈ rocking shaft 124ᵃ clockwise and moving the clutch cam 124 into its operative position to co-operate with clutch member 60ᵃ (Fig. 10) so that as the latter engages the clutch cam 124 it will be disengaged from worm wheel 50 and the shaft 51 will cease to operate. In order to hold the clutch cam 124 in the position to which it is moved it may be provided with an impositive latch comprising a pointed arm 125 fixed on shaft 124ᵃ and cooperating with a stud on an arm 126 held by a spring 127 against such arm.

When the shaft 51 stops, shafts 54 and 58, of course, also stop. Shaft 54 through linkage 130 drives the notice card clip carriage for the feeding of the notice card and thus these clips cease to operate. Similarly linkages 131 and 132 drive the notice card picker and are actuated by shaft 58 as more specifically disclosed in my aforesaid application, so that this picker also ceases to operate. Shaft 43 on the other hand continues to operate and continues to drive shaft 33 so that master cards continue to be fed through the machine. Thus during the next cycle of operation of the machine another master card is fed by the picker and is preread to ascertain whether it is active or inactive. Should the card be active the feeler 90 (Fig. 13) will, upon rising, engage in a perforation as at 8ᵇ and stop the rising of the finger 84. This in turn stops the link 107 from rocking downwardly on engage bell crank 108. Thus the bell crank does not rock and latch 112 (Fig. 9) continues to hold the stud 113 in its upper position with the member 117 in its right hand position so that when said member rises it will co-operate with pin 117ᵇ on the arm 123 raising this pin if it is in its lower position, or having no effect thereon if the pin is in its upper position. Presuming the pin to be in its upper position and the clutch member 124 to be in its outer or inoperative position, shaft 51 will be permitted to continue to operate. Shafts 54 and 58 will thus also continue to operate. Shaft 58 (Fig. 8) is provided with complementary cams 133 and 134 co-operating with followers 135 and 136 on bell crank 137 (see also Fig. 10). This bell crank is connected to arm 138 and through link 139, bell crank 140, link 141 and arm 142 (Fig. 9) to a clutch cam 143 adapted to co-operate with clutch member 60 (Fig. 10) to disconnect shaft 43 from worm wheel 44, causing the shaft 43 to cease to operate. Thus if the card is found by the prereading device to be active the notice card feeding elements continue to operate causing the notice card to be fed into the machine to receive printed and perforated data to be taken from the active master card. The continuation of the operation of shafts 51, 54 and 58 also effects the operation of the mechanisms for reading the master card in the position $M^3$ of Fig. 5 and for controlling the printing and perforating upon the notice card. Several cycles of operation of the machine are required to effect these results, that is, several cycles of operation of shaft 51, but by reason of the reduction gearing between this shaft and shaft 58 the latter shaft turns but one revolution during these operations. Near the end of these operations shaft 58 again through complementary cams 133 and 134 actuates clutch cam 143 rocking it to its inoperative position to permit shaft 43 to again commence to rotate. This then causes the next master card to be fed from the supply stack and to be preread and the machine will then be controlled by this card. When a card is found to be inactive and latch 112 releases bell crank 114 moving member 117 to the left to cause stoppage of shaft 51 the latter shaft stops before the notice card is fed into the machine. The continued operation of shaft 43 then not only feeds in the next master card for prereading, but also through a cam arm 144 rocks a bell crank 145 (Fig. 9) clockwise and through link 146 raises bell crank 114 relatching it over latch 112 and moving member 117 back to its normal right hand position. If the card being preread during this cycle of the operation of the machine is active and the member 117 thus remains in its right hand position it will during its next rising operation rock the arm 123 and move clutch cam 124 to release shaft 51 permitting the notice card to then be fed into the machine to receive printed and perforated data taken from the master card being fed into the machine. Also the regular reading and printing devices will be permitted to function.

After the fingers have performed their prereading operations the parts are returned to normal position by the action of cam 105 upon the bell crank 102. This raises link 101 and the rod 96. The latter in turn raising link 92 rocking shaft 80 counterclockwise and lowering the fingers 84, 85 and 86. As the link 92 rises a pin 150 carried thereby engages arm 151 pivoted at 152 and constructed to include a bail 153 engaging the rearward projections 154 of the fingers 84, 85 and 86. The rising of link 92 thus rocks the fingers from the position of Figs. 13 and 15 to that of Fig. 16 out of co-operation with the master card so that the latter may then be taken by the clips and moved on. At the beginning of the downward movement of link 92 the fingers will first be released by pin 150 and bail 153 and permitted to rock into cooperation with the master card and will thereafter be raised to preread the perforations as described. In Figs. 11 and 12 an adjustable set screw 155 is shown carried by the frame 79. This set screw is adapted to co-operate with the rear end of finger 82 as indicated in Fig. 16 to limit the counterclockwise rotation of shaft 80 as viewed in Figs. 13, 15 and 16.

In Fig. 18 I have shown a portion of the mechanism for sensing a record card in the $M^3$ position and mechanism controlled by said sensing mechanism. This mechanism is completely disclosed in my aforesaid patent and for this reason need not be more fully disclosed here. Briefly, the sensing elements comprise feeler pins 160 pressed by springs 161 against the card $M^1$ when released by member 162. These pins control the setting of stops 163 which in turn control the positions to which the combination combs 164 descend. These combs determine which of stops 165 shall advance to determine the stopping position of a rising type carrier 166. A hammer 167 is then released to actuate a plunger 168 which drives the type element 169 against the ink ribbon 170 and the notice card 6.

In the operation of the machine, if a master card is active, these devices for analyzing the master card and for effecting the printing and perforating of a notice card are caused to operate by the continued operation of the proper driving shafts. But if the master card is inactive operation of these devices is suppressed.

I claim:—

1. In a perforated-record-controlled machine, means for analyzing records, means controlled by said analyzing means for controlling the subsequent operation of the machine, means for feeding records to said analyzing means and means for prereading a record for controlling the operation of said analyzing means.

2. In a record controlled machine, means for analyzing records, said means being adapted to control the operation of the machine, means for feeding records to said analyzing means and means for prereading a record before it reaches said analyzing means, said prereading means being adapted to control said analyzing means.

3. In a record controlled machine, means for analyzing a record, said means being adapted to control the operation of the machine, means for feeding records to said analyzing means, means for prereading a record while it is being fed to the analyzing means and means controlled by said prereading means for controlling the operation of the machine.

4. In a perforated record controlled machine, means for analyzing records, said means being adapted to control the subsequent operation of the machine, means for feeding records to said analyzing means, preanalyzing means adapted to analyze a record before it reaches said first named analyzing means and means controlled by said pre-analyzing means for controlling said first named analyzing means and subsequent operation of the machine.

5. In a machine of the class described, means for feeding companion records through the machine, means for analyzing one of the records, said analyzing means being adapted to control the operation of the machine, a pre-analyzing device adapted to analyze a record before it reaches said first named analyzing means and means controlled by said device for controlling the operation of said feeding means.

6. In a record controlled machine, record analyzing means adapted to control certain operations of the machine, means for feeding records to said analyzing means, pre-analyzing means adapted to analyze a record before it reaches said first named analyzing means and means controlled by said pre-analyzing means for controlling said record feeding means.

7. In a record controlled machine, means for analyzing a record, means controlled by said analyzing means for controlling the subsequent operation of the machine, a pre-analyzing device adapted to analyze a record before the operation of said first named analyzing means and means controlled by said device for suspending the operation of said first named analyzing means.

8. In a record controlled machine, means for feeding records, separate devices for analyzing records in two positions in the machine, means controlled by one of said devices for controlling a sequence of operations of the machine, and means controlled by the other of said devices for changing the sequence of controlling operations of the machine.

9. In a record analyzing machine, means for feeding records one by one from a stack of records and means for analyzing a record before it has been fed from the stack.

10. In a record analyzing machine, means for feeding records one by one from a stack of records and means for analyzing each record separately while it is being fed from the stack.

11. In a record-analyzing machine, a feeler, means for moving said feeler over the surface of a record, said feeler being adapted to sense an interruption in the surface of a record, and means controlled by said feeler for controlling operations of the machine.

12. In a record analyzing machine, means for feeding records, means for analyzing a record while the record is idle in the machine, means for analyzing the record while it is moving and means controlled by both of said analyzing means for effecting a control upon the operation of the machine.

13. In a record controlled machine, means for driving the machine through a predetermined order of operations, record analyzing means and means controlled by said analyzing means for changing the order of such operations.

14. A record controlled machine comprising record feeding means for feeding a pair of records, analyzing means for analyzing one record of each pair and controlling a sequence of operations on the other record of the pair and an additional record analyzing means for selectively preventing the sequence of operations on the last named record.

In testimony whereof I hereto affix my signature.

JOHN ROYDEN PEIRCE.